Figures 1, 2, 3, 4, 5:
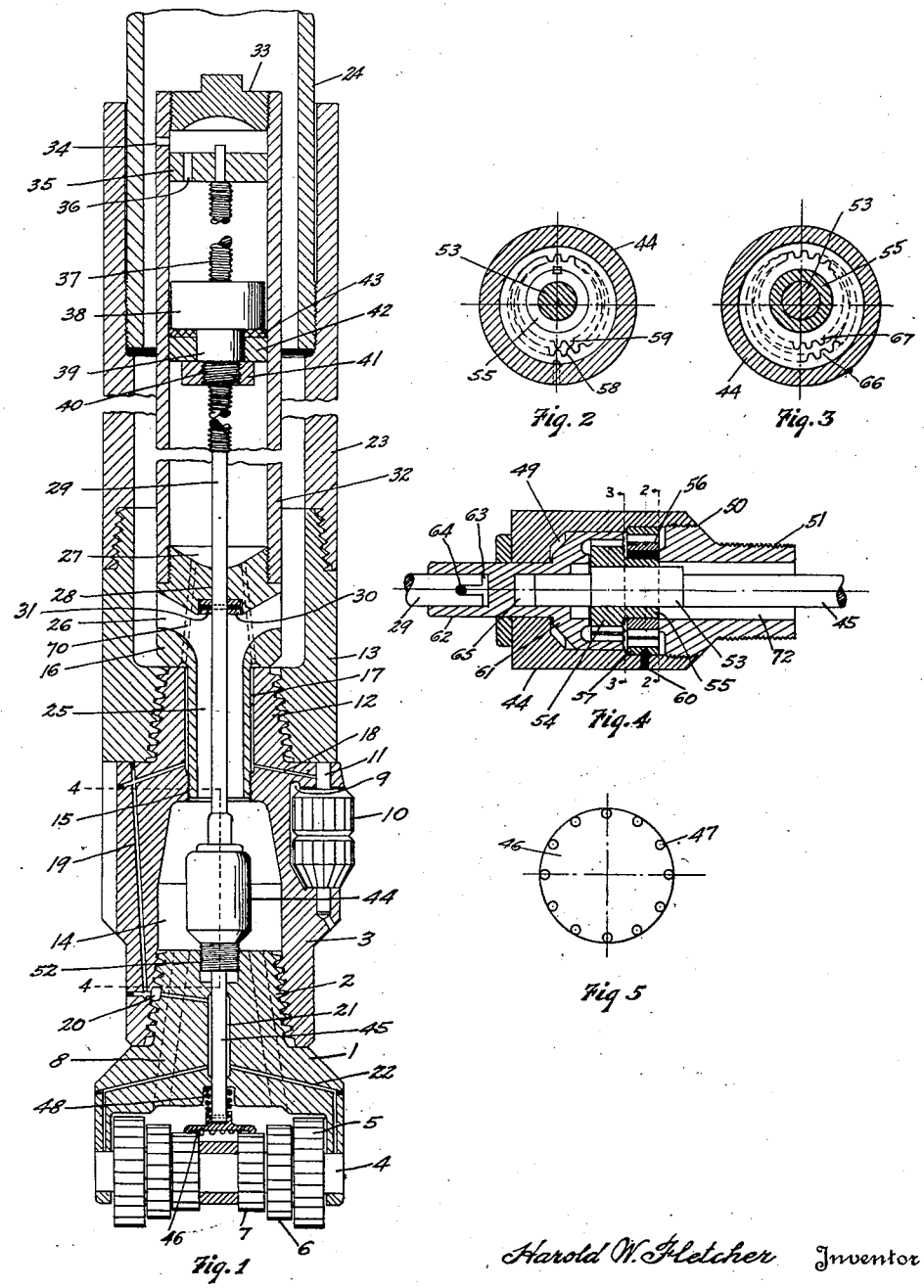

Jan. 8, 1924.

H. W. FLETCHER

GEAR OPERATED LUBRICATOR

Original Filed Nov. 13, 1922

1,480,536

Harold W. Fletcher, Inventor

By Jesse R. Stone

Attorney

Patented Jan. 8, 1924.

1,480,536

UNITED STATES PATENT OFFICE.

HAROLD W. FLETCHER, OF HOUSTON, TEXAS.

GEAR-OPERATED LUBRICATOR.

Application filed November 13, 1922, Serial No. 600,631. Renewed November 19, 1923.

*To all whom it may concern:*

Be it known that I, HAROLD W. FLETCHER, a citizen of the United States, residing at Houston, Harris County, Texas, have invented a certain new and useful Improvement in Gear-Operated Lubricators, of which the following is a full, clear, and exact description, such as will enable others skilled in the art to which it appertains to make and use the same.

My invention relates to lubricators for earth boring drills.

An object is to provide a lubricator for a roller earth boring drill wherein the actuating force upon the plunger tending to move it downwardly upon the lubricant is accomplished through a driving connection with the rotating cutters of the drill.

Another object is to furnish means to move the lubricator plunger slowly and uniformly as the drill rotates, and thus furnish lubricant to the cutters only when needed and with the required slow speed of flow.

The further objects and advantages of my present invention will be brought out fully in the specification which follows and will be set out with more particularity in the claims appended hereto.

Referring to the drawing herewith, wherein like numerals of reference are applied to like parts in all the views; Fig. 1 is a central longitudinal section through a common type of roller earth boring drill showing my invention applied thereto. Figs. 2 and 3 are transverse sections on the lines 2—2 and 3—3, respectively of Fig. 4. Fig. 4 is a central longitudinal section through a speed reduction means employed in my invention, and Fig. 5 is a bottom plan view, somewhat enlarged, of the type of gear employed in operating the plunger shaft.

In the drawing I have shown the device as applied to an ordinary type of cross-roller drill now well known in well drilling. It comprises a head 1, having an upper threaded shank 2 for attachment to a reamer 3. The section here shown discloses a cross shaft 4 supported in the lower end of the head of the drill and carrying thereon a series of cylindrical toothed cutters, 5, 6 and 7, said cutters increasing in diameter from the central portion of the shaft toward either end. Longitudinal channels shown in dotted lines at 8 serve to conduct flushing fluid through the head of the drill and discharge the same upon the cutters.

Above the drill is the reamer 3 previously referred to, said reamer having pockets or recesses 9 in the periphery thereof to receive reaming cutters 10 mounted upon a vertical shaft 11. The upper end of the reamer is formed with a tapered shank 12 threaded for attachment to a nipple 13. A central chamber 14 is formed within the reamer and the upper end this chamber is reduced in diameter and threaded at 15 to receive a downwardly extending neck or tube upon a lubricator collar 16. As will be noted, this collar is threaded only at the lower end and fits slidably in the central portion of the shank 12 of the reamer, and has longitudinal ducts 17 to allow passage of lubricant from the upper end of the reamer shank downwardly to branching oil ducts 18 leading to the shafts of the reaming cutters, and oil ducts 19 leading to the lower end of the reamer and connecting with a small chamber 20 formed in the shank of the drill and having ducts leading to a central channel 21 from which lubricant may flow through the oil ducts 22 to the bearings of the cutters.

The nipple 13 has a tapered socket at its lower end to receive the reamer shank and is enlarged above the socket to the size of the drill stem. It is connected to the drill stem 24 by means of a drill collar 23.

The lubricator collar 16 has a central channel 25 extending from the lower end upwardly and terminating in two lateral branches 26 leading to the outer face of the lubricator collar above the reamer. The upper end is dished at 27 and has a central opening 28 to receive the operating shaft 29 connected with the piston. The lower end of the opening 28 is enlarged to receive a thrust bearing 30 secured to the shaft 29 by means of a diametrical pin 31. The lubricator collar is connected to the lubricator barrel 32 which projects upwardly into the drill stem and has a cap or plug 33 screwed therein at the upper end, to close said upper end. Below the cap 33, the barrel is perforated at 34 to allow the entrance of flushing water to the lubricator.

A bearing is formed for the upper end of the shaft 29 in a guide disc 35 of the same diameter as the inner face of the lubricator barrel. A perforation 36 in the guide disc allows the passage of fluid to the plunger.

The shaft 29 is formed to rotate longitudinally within the lubricator barrel and is threaded at 37 throughout most of the length of the lubricator barrel to form a driving connection with the piston. The piston, which is threaded on the shaft, has an upper head 38, said head having a shank 39 on the lower side. The shank 39 is threaded at 40 to receive a lock nut 41. Between the lock nut 41 and the lower face of the head 38 is a metallic washer 32 and a compressible washer 43 made of rubber or other compressible composition so as to provide a tight frictional fit between the plunger and the inner walls of the lubricator barrel. It has been found by experiment that where the plunger fits tightly within the said barrel it will not easily rotate, especially where a thick and viscous lubricating oil is used. The plunger will be allowed to slide longitudinally in the barrel and this sliding action is caused by the rotation of the screw shaft within the plunger. It is understood therefore that a plunger will be maintained against rotation with the shaft by friction of the plunger alone. Ordinary well-known expedients to prevent rotation, such as a rod or a key may be provided in some forms of lubricator, but are found to be unnecessary in the type here shown.

The drive shaft 29 is smooth toward the lower end of the lubricator barrel for rotation within the lubricator collar. Below this collar the shaft extends through the central chamber 14 within the reamer and is connected by a reduction gearing, housed at 44, to a lower shaft 45. This lower shaft has a bearing in the head of the bit and projects into the lower housing in the lower face of the drill which protects the cutters 5, 6 and 7. It has on the lower end a gear 46 secured to the shaft by means of a cross pin extending through the upper shank of the gear and the shaft. The gear is a flat horizontal disc having a series of downwardly projecting teeth 47 on its lower face, said teeth being spaced apart so as to mesh with the teeth upon the two smaller interior cutters 7 of the drill. The shaft 47 with the gear thereon is vertically movable to a limited extent in the head of the drill and is held resiliently downwardly by means of a coiled spring 48 fitting between the upper shank of the gear and the upper wall of a socket in the lower end of the head.

The piston in the lubricator barrel must be forced downwardly upon the lubricant at a comparatively slow rate of speed. The rotation of the shaft 29 by means of the cutters 7 of the drill would under ordinary circumstances feed the plunger downwardly in the lubricator barrel at an excessive rate. I have therefore employed a reduction gear within the housing 44. The construction of this gear is shown particularly in Figs. 2, 3 and 4. It comprises an outer housing 44 having an inner chamber 49. The lower end of this chamber is slightly enlarged and is threaded to receive a plug or nut 50 which is reduced in diameter at the lower end and threaded at 51 for attachment within the upper end of the head of the drill as shown at 52 in Fig. 1. The lower shaft 45 passes through a channel 72 in the plug 50 and has centrally of the chamber 49 an eccentric portion 53. This enlarged eccentric portion has mounted rotatably thereon the gear 54. This gear has a reduced lower end 55 upon which is keyed a gear 56 having outer radial teeth 59 formed thereon. These teeth are adapted to mesh with a larger ring gear 57 having internal teeth 58 thereon to mesh with the radial teeth 59 upon the gear 56. The gear 57 is held nonrotatably in the housing by means of a radial pin 60.

In the upper end of the housing 44 is a rotatable member 61 having a reduced shank 62 thereon which fits rotatably in the upper end of the housing and has a central socket 63 therein to receive the lower end of the shaft 29. The said shaft is received nonrotatably in the socket by having a lower forked end formed in said shaft which receives a diametrical pin 64 in the said shank. The lower end of the rotatable member 61 is enlarged to fit within the chamber 49 and has a recess 65 to receive the upper end of the shaft 45, it being of sufficient depth to allow a slidable movement of the shaft 45 therein. The lower end of the rotatable member is formed with internal teeth 66 which are adapted to interfit with radial teeth 67 formed on the outer periphery of the gear formed on the enlarged upper end of the gear member 54. It will be noted that the outer internally toothed gears formed on the ring gear 57 and the rotatable member 61 are of larger diameter than is necessary to receive the gears mounted upon the member 54. The eccentric mounting of the gears 54 is such that during rotation of the shaft, they are carried around inside of the housing with a planetary movement and are in mesh with the outer gears on only one side thereof. The rotation of the gear 56 by contact with the ring gear 57 will cause the rotation of the gear 54, and the meshing of the teeth on this last gear with the rotatable member 61 will cause the member 61 to also rotate. The larger number of teeth on the gear 56 compared with those on the gear 54 will give a large ratio of reduction, and the applicant has by the arrangement shown here provided a reduction of over one hundred to one.

In the operation of this device the rolling of the cutters 7 upon the bottom of the hole as the drill is operated will cause the rotation of the gear 46 and the shaft 45. The rotation of the shaft 45 by means of the reduction gear just described will cause the rotation of the shaft 29 at a much reduced speed. This shaft will, during its rotation, screw the plunger 38 downwardly upon the lubricant in the chamber. The pressure of the flushing fluid which would tend to cause a back pressure against the feed of the lubricant below the plunger to the bearings will be overcome by the entrance of flushing fluid through the opening 34 above the plunger. The pressure in fact will be somewhat greater above the plunger than below, but due to the threaded attachment of the plunger to the shaft the plunger will not move downwardly until the shaft is rotated. It is contemplated that the right reduction of speed of the shaft 29 may be obtained by experiments so that the plunger will force the lubricant down in the exact quantity desired for the most efficient operation of the drill. The lubricant within the lubricator barrel will be forced through the ducts 70 to connect with the ducts 17 in the upper end of the reamer as previously described and will find its way to the bearings of the cutters.

The particular advantage of this type of lubricating device is that it will feed the lubricant only when the drill is operating and its speed of movement may be very closely predetermined so that it will feed the desired quantity of lubricant during the operation of the drill.

Having thus described my invention, what I claim as new and desire to protect by Letters Patent is:

1. In an earth boring drill, a head, vertical toothed cutters rotatable thereon in combination with means to lubricate the bearings of said cutters comprising, a lubricator barrel on said head, having ducts leading to said cutters, a piston therein, a central shaft in said barrel threaded longitudinally through said piston and having bearings in the head, a second vertical shaft connected with said first named shaft by a speed reduction means, said second shaft having a limited vertical motion, a horizontal disc on the said second shaft, teeth thereon adapted to mesh with the teeth of said cutters so as to rotate said gear and shaft.

2. In an earth boring drill, a head, vertically mounted toothed cutters rotatable in said head, means to lubricate the bearings of said cutters comprising a lubricator barrel on said head, a piston therein, a central shaft in said barrel threaded longitudinally through said piston, a second longitudinal shaft extending centrally through said head and connected to said first named shaft by a speed reduction device and a gear mounted on the lower end of said second shaft having downwardly projecting teeth adapted to coact with the teeth of said cutters to rotate said shaft, and feed the lubricant in said barrel through ducts in said head to said cutters.

3. In an earth boring drill, a head, toothed cutters rotatably mounted on the said head, means to lubricate the bearings of said cutters, comprising a lubricator barrel on said head, a piston in said barrel, a longitudinal shaft having threaded connection with said piston, a second shaft extending longitudinally through the center of said head, connecting means between said shafts allowing a limited vertical play to said second shaft, a gear on the lower end of the latter adapted to coact with said cutters to rotate said shafts, and means to hold said gear resiliently against said cutters.

4. In an earth boring drill, a head, toothed cutters mounted rotatably thereon, a lubricator barrel on said head, a piston in said barrel, a shaft extending longitudinally of said barrel and having operative connection with said piston whereby the rotation of said shaft will move said piston longitudinally of the barrel, a second shaft longitudinally of said head, a gear at the lower end thereof having operative connection with said cutters, a connection between said shafts, and means to retain said gear in contact with said cutter.

5. In an earth boring drill, a head, toothed cutters mounted rotatably thereon, a lubricator barrel on said head, a piston therein, a shaft having threaded engagement with said piston, said shaft extending through the lower end of said barrel, a second shaft extending centrally through said head, a gear on the lower end of said second shaft adapted to be held resiliently in operative engagement with said cutters, and a connection between said shafts.

6. In an earth boring drill, a head, toothed cutters mounted rotatably thereon, a lubricator barrel on said head, a piston therein, a shaft in said barrel having threaded engagement with said piston, a cooperating shaft centrally of said head, a gear on said last named shaft having teeth coacting with teeth on said cutters and means to hold said gear resiliently downward.

7. In an earth boring drill, a head, toothed cutters rotatable thereon, a lubricator barrel on said head, a piston therein, a shaft in said barrel having threaded engagement with said piston, a cooperating shaft mounted in said head and connected with said first named shaft by a speed reduction device, a gear on said cooperating shaft having teeth adapted to mesh with teeth on said cutters for the purpose described.

In testimony whereof, I hereunto affix my signature this 9th day of November, A. D. 1922.

HAROLD W. FLETCHER.